United States Patent [19]

Chapman

[11] Patent Number: 5,671,932
[45] Date of Patent: Sep. 30, 1997

[54] CAMERA CRANE

[75] Inventor: Leonard T. Chapman, North Hollywood, Calif.

[73] Assignee: Leonard Studio Equipment, Inc., North Hollywood, Calif.

[21] Appl. No.: 317,807

[22] Filed: Oct. 4, 1994

[51] Int. Cl.⁶ .................................................. B62D 51/04
[52] U.S. Cl. ........................... 280/47.11; 280/763.1; 180/19.1; 180/326; 212/301; 212/195; 301/36.1; 301/122.5
[58] Field of Search ............... 280/47.11, 758, 280/759, 763.1, 760, 762, 769; 212/195, 178, 180, 301, 901; 414/561; 16/16; D34/33–37; 52/634, 636, 651.05, 653.2, 656.1; 248/123.1; 180/19.1, 326, 329, 330; 301/36.1, 114, 122.5

[56] References Cited

U.S. PATENT DOCUMENTS

| | | | |
|---|---|---|---|
| 1,645,060 | 10/1927 | Kraft | 52/634 |
| 2,661,672 | 12/1953 | Fairbanks | 280/47.11 |
| 3,088,537 | 5/1963 | Tourneau | 180/329 |
| 3,485,383 | 12/1969 | Beduhn | 212/195 |
| 3,614,135 | 10/1971 | Eid | 280/759 |
| 3,876,024 | 4/1975 | Shieman et al. | 180/19.1 |
| 4,094,484 | 6/1978 | Galione | |
| 4,381,060 | 4/1983 | Morrow | 212/195 |
| 4,700,851 | 10/1987 | Reeve | 212/232 |
| 4,907,768 | 3/1990 | Masseron et al. | 248/123.1 |
| 5,035,337 | 7/1991 | Juergens | 212/195 |
| 5,092,422 | 3/1992 | Hood et al. | 180/329 |
| 5,312,121 | 5/1994 | Chapman | |

FOREIGN PATENT DOCUMENTS

| | | | |
|---|---|---|---|
| 568964 | 7/1958 | Belgium | |
| 3739471 | 6/1989 | Germany | 280/47.11 |
| 616414 | 2/1961 | Italy | |

OTHER PUBLICATIONS

Brochure—Lenny Arm II By: Chapman, 1994.
Brochure—Model 9 Camera Dolly Optional Accessories, J.L. Fisher, Inc.
Brochure—The HYBRID dolly by Chapman, 1990.
Brochure—The Lenny Arm By Chapman, 1992.
Brochure—The Hy Hy Crane Arm Base By Chapman, 1993.
Brochure—Chapman–Electra II/Nike Stage Crane, 1988.
Brochure—Zeus Stage Crane by Chapman, 1988.

*Primary Examiner*—Anne Marie Boehler
*Attorney, Agent, or Firm*—Lyon & Lyon LLP

[57] ABSTRACT

A camera crane for use in motion picture and television productions, has a mast on a wheeled chassis. A weight bucket on the chassis around the mast securely holds counterweights used to balance arm. The steering section of the mobile base can be pivoted into a low position, to allow the arm to swing around the mobile base, without interference. A leveling system on the mast levels the mast, regardless of the orientation of the chassis. Outriggers are provided as an accessory to help stabilize the mobile base. Stiffening tubes on the arm stiffen the arm and protect the arm core.

16 Claims, 11 Drawing Sheets

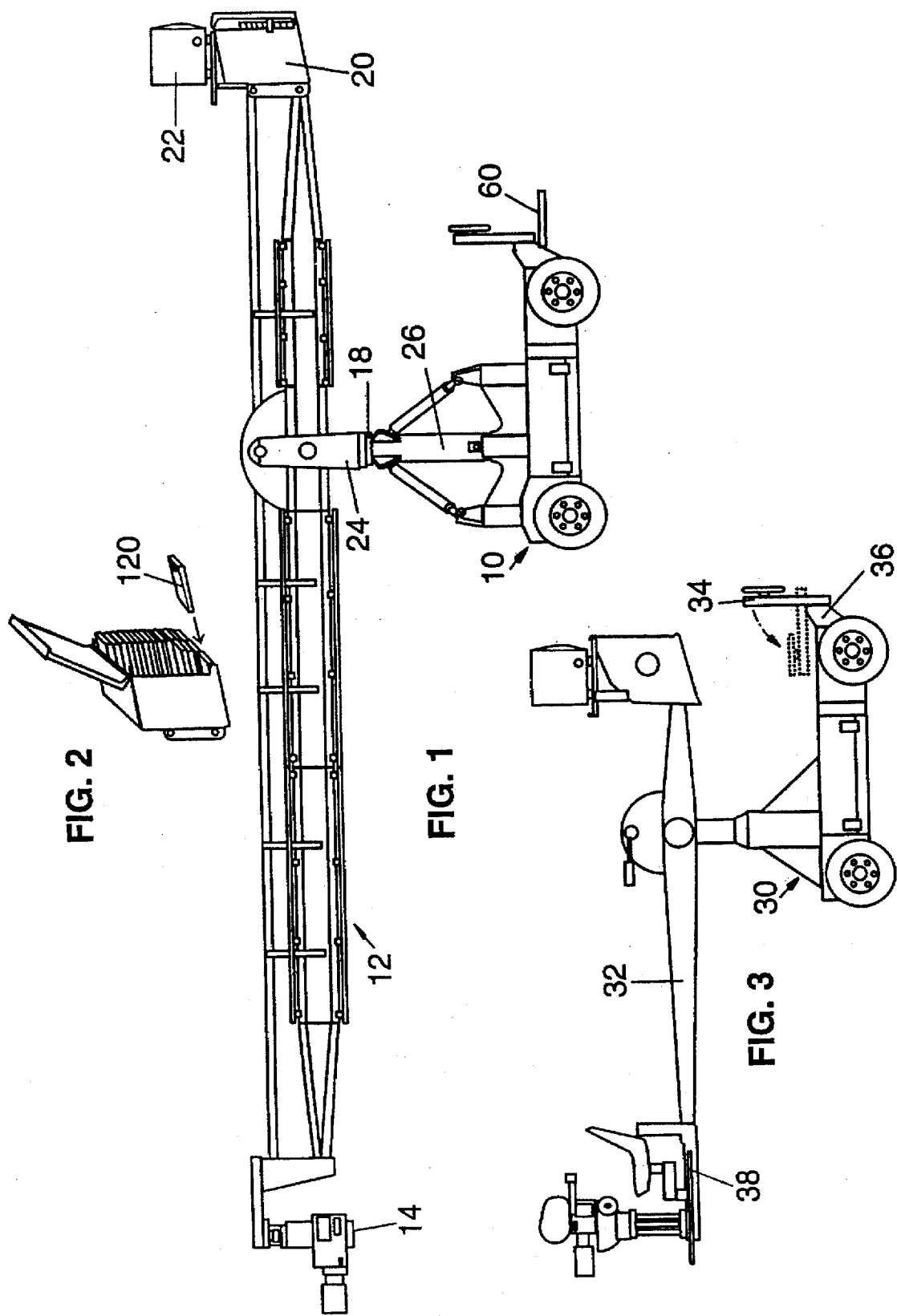

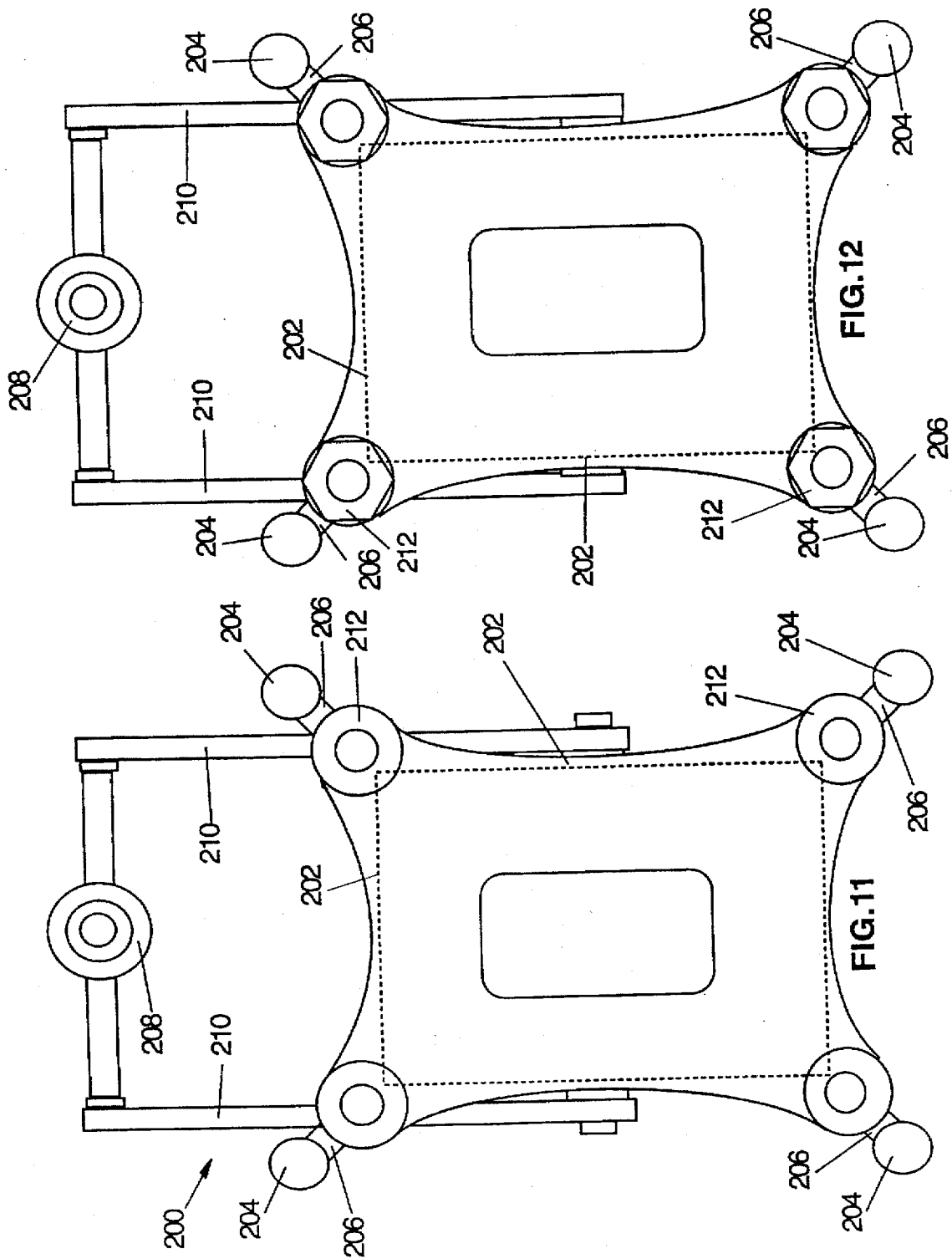

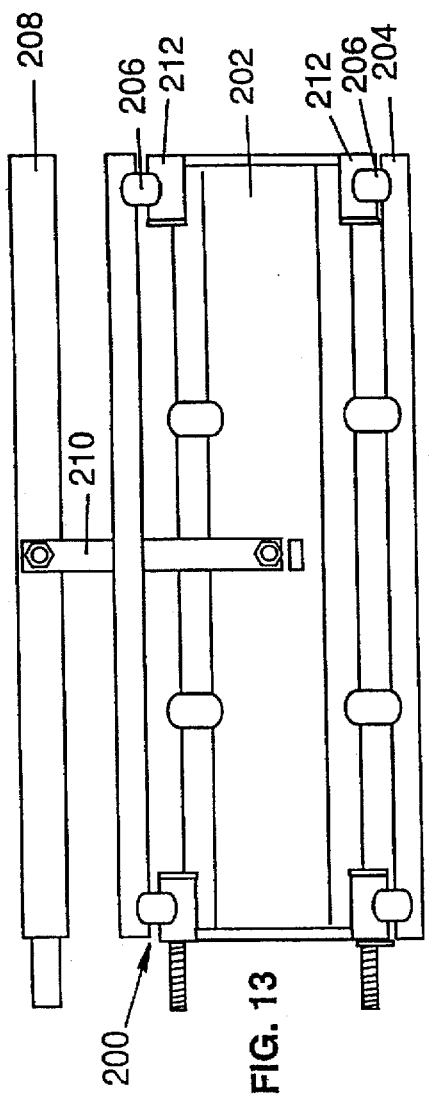
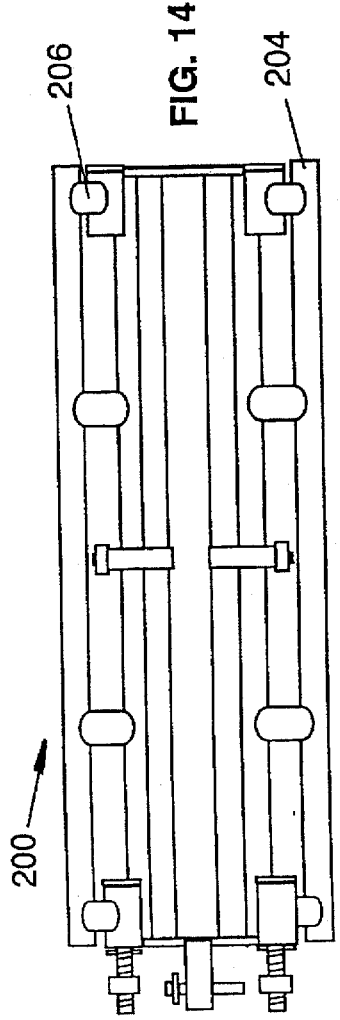
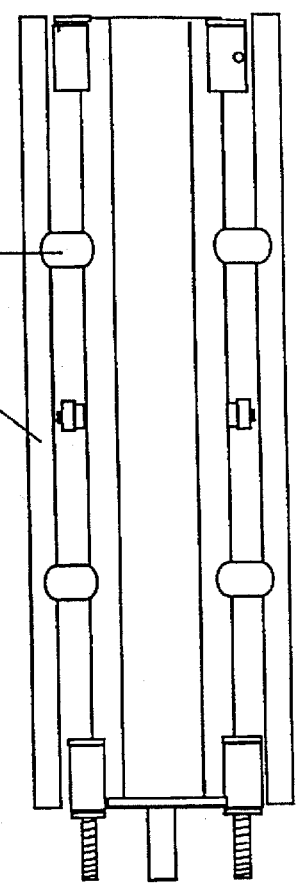
FIG. 13
FIG. 14
FIG. 15

CAMERA CRANE

BACKGROUND OF THE INVENTION

The field of the invention is camera cranes and dollies.

Camera cranes and dollies are frequently used in motion picture and television production. The motion picture or television camera is mounted on an arm supported on a mobile base or dolly. The mobile base may be pushed and maneuvered by "grips". Larger units, which have more weight carrying capacity and longer reaches, typically have electric driving motors powered by on board batteries. The mobile base is intended to provide a stable and smooth riding platform for supporting the arm and camera, so that the camera is held steady. For added smoothness, cranes often operate on track of various types. Mobile bases with crane arms supporting camera are frequently used in the television production of sporting events, concerts, and other televised or filmed events.

In order to achieve certain desired camera angles, the motion picture or television camera is frequently mounted at the front end of a long boom arm supported on the mobile base. To reduce large moments acting on the mobile base, counterweights are typically provided in a weight bucket at the back end of the arm. Sufficient counter weights are used to balance the arm on the mobile base. With the arm in balance, the camera can be raised and lowered with the grips applying only moderate force by hand. In certain applications, a turret may be provided on the end of the arm, to support the camera and one or more camera operators. In these situations, the large payload on the arm requires a large number of counterweights, to balance the arm. Transporting and storing the counterweights can be time consuming and difficult, especially when large numbers are required.

The mobile base may also operate on rough ground during one sequence or application, and subsequently run on track, in another application, making use of different types of tires desirable. In other applications, it may be necessary or desirable to swing the arm around more than 180° on the mobile base, with the front end of the arm at any vertical position. This movement requires that the base have no components to interfere with the arm movement.

While various camera cranes have been widely known and successfully used, various disadvantages remain in storing and transporting counterweights, in pivoting an arm more than 180°, and in changing wheel/tire arrangements on the mobile base. Disadvantages also remain in that crane arms can lack the sufficient rigidity necessary for holding the camera steady during quick moves, in windy conditions, etc.

Accordingly, it is an object of the invention to provide an improved camera crane.

SUMMARY OF THE INVENTION

To these ends, a mobile base has weight buckets around a levelable mast on the chassis of the mobile base, for securely storing and transporting counterweights. The steering block of the mobile base can be pivoted forward, or to one side, to avoid interfering with movement of the arm supporting the camera. Outriggers attached to the chassis of the mobile base may be advantageously used to stabilize the mobile base in specific applications. An improved crane arm has support tubes which increase the bending modulus of the arm and protect the core section of the arm.

BRIEF DESCRIPTION OF THE DRAWINGS

In the drawings, wherein similar reference characters denote similar elements throughout the several views:

FIG. 1 is a side elevation view of the present mobile base supporting an arm having a camera at one end, and counter weights at the other end;

FIG. 2 is an enlarged perspective view of the weight bucket on the arm shown in FIG. 1;

FIG. 3 is an alternative embodiment of a mobile base;

FIG. 11 is an end view taken along line 11—11 of FIG. 9;

FIG. 12 is an end view taken along line 12—12 of FIG. 9;

FIG. 13 is a side elevation view of the arm section of FIG. 10;

FIG. 14 is a plan view thereof;

FIG. 15 is a bottom view thereof; and

DETAILED DESCRIPTION OF THE PREFERRED EMBODIMENTS

Figure 4:
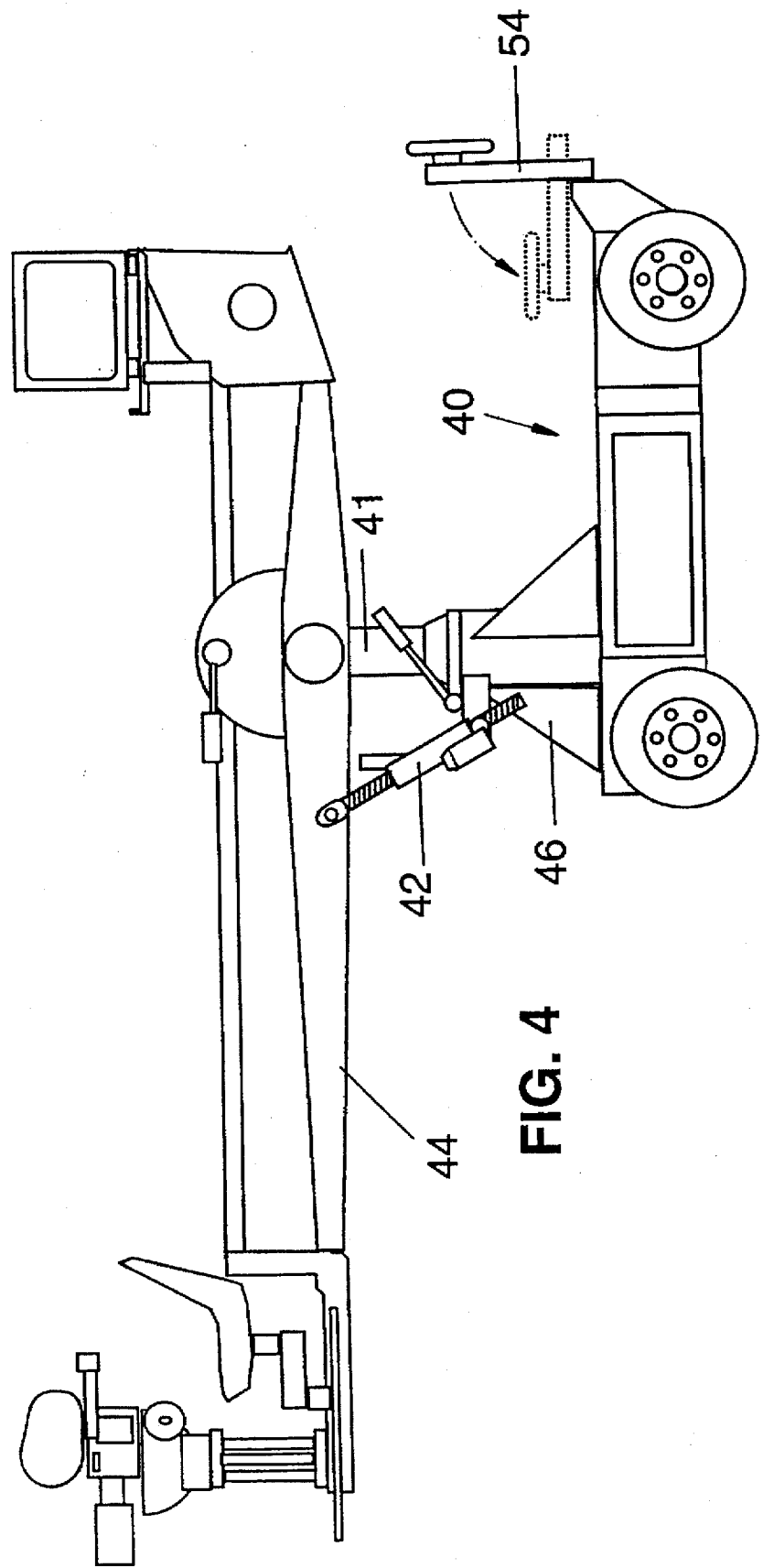
FIG. 4 is a third embodiment of a mobile base.

As shown in FIG. 1, a mobile base 10 supports an arm 12 having a camera 14 at its front end. An arm weight bucket 20 at the back end of the arm 12 holds counterweights used to balance the arm 12. A monitor 22 can be advantageously positioned above the arm weight bucket 20 with the weight of the monitor contributing to balancing the arm 12. This configuration is desirable in sports applications, for audience viewing. An arm frame 24 is attached to and supported on a mast 26 of the mobile base 10. The arm 12 is pivotally attached to the arm frame 24 through a vertical pivot 16, to allow the camera 14 to be raised and lowered. A horizontal pivot 18 between the mast 26 and arm frame 24 allows the camera 14 to be panned (i.e., with the arm turning or rotating about the mobile base 10). FIG. 2 shows the placement of the counterweights 120 into the weight bucket 20 at the back end of the arm 12, for balancing the arm.

Turning to FIG. 3, a second embodiment mobile base 30 is shown with an arm 32 having a turret 38, holding a camera and a seat for a camera operator. The mobile base 30 (shown as an Electra II™, manufactured by Chapman Studio Equipment, Inc., North Hollywood, Calif.) has a folding or pivoting steering block 34 which swings about a fold joint 36, to the alternate position A, so that the arm 32 can be pivoted entirely about the mobile base 30, even with the camera at a low vertical position.

As shown in FIG. 4, a third embodiment mobile base 40, similar to the second embodiment shown in FIG. 3, has an electrically powered linear actuator 42 extending between the beam 44 of the arm, and the arm frame 41, which rotates or pans with the arm. The linear actuator 42 raises and lowers the arm 44, in place of having the mobile base operators or grips manually raise and lower the arm. Preferably, controls for the linear actuator 42 may be provided at the turret 38, so that the camera operator can raise and lower the arm. When the linear actuator 42 is not energized, it acts as a brake on the arm, preventing the arm 44 from pivoting up or down. The linear actuator 42 may also be controlled by the operator steering the mobile base at the steering wheel 54, or remotely. The panning action is still manually operable. Similarly, a panning actuator may be provided to automatically pan the arm.

Figure 5:
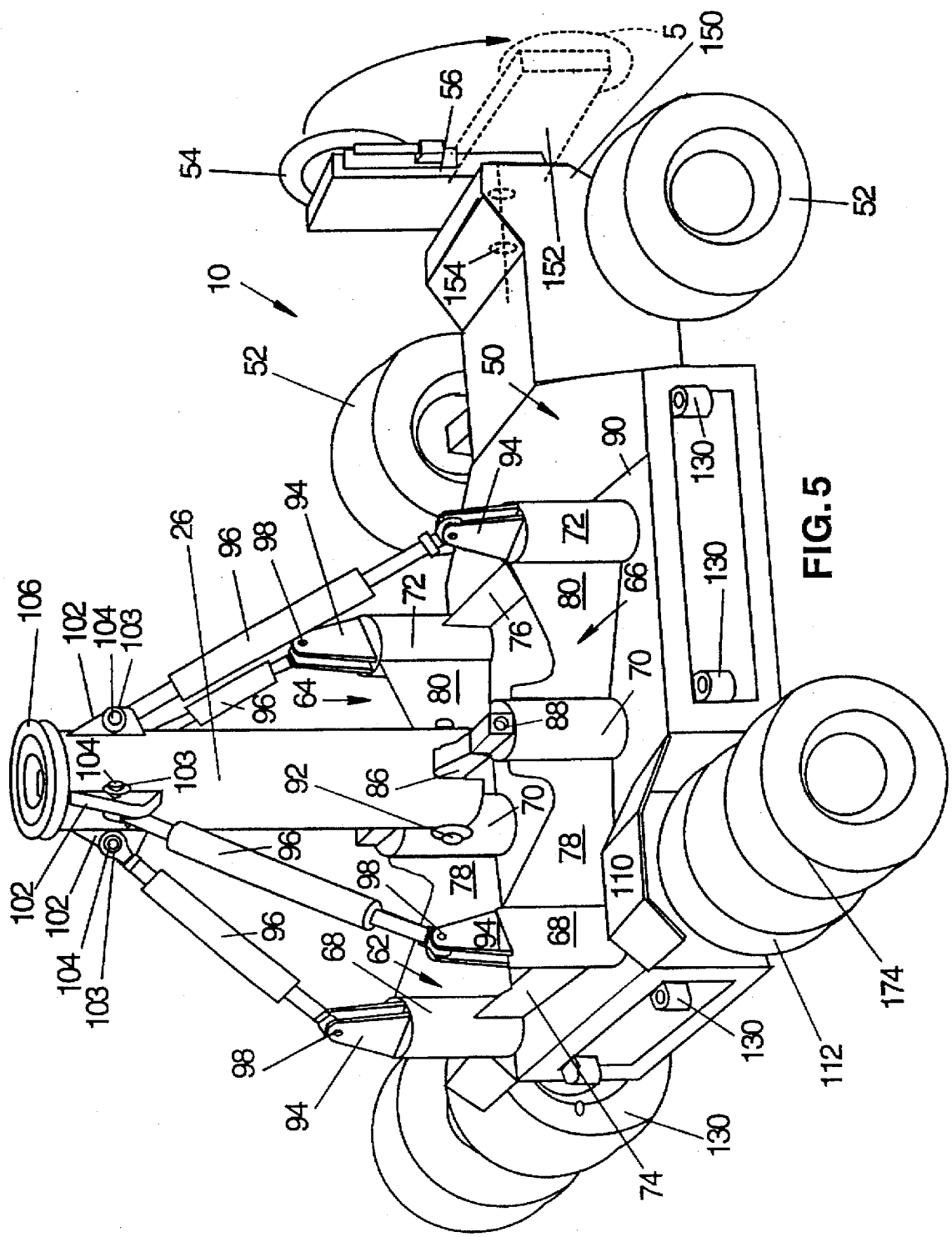
FIG. 5 is a perspective view of the mobile base of FIG. 1, without the arm on the base and with the center walls for clarity deleted.

Turning to FIG. 5, a steering wheel 54 is supported on a steering block 56 attached to the chassis 50 at a hinge joint 58, to allow the steering block 56 to pivot forwardly, so that it does not interfere with the arm, when the arm is pivoted around more than about 180°. In an alternative embodiment, the steering block 56 is replaced entirely with a narrow steering column 152 (shown in phantom in FIG. 5) which supports the steering wheel 54. The steering column 152 pivots to the side about a lateral pivot 154. In this simplified design, the steering column 152 pivots about a sprocket which drives the steering system of the mobile base, and is linked to a sprocket attached to the steering wheel 54 via chains. As shown in FIGS. 1 and 4, an operator's platform 60 supports a seat for the mobile base operator, behind the steering wheel 54. The operators feet rest on brake pedals on either side of the steering wheel.

Referring still to FIG. 5, a forward weight bucket 62 and a rear weight bucket 64 are formed preferably in a weldment 66 on a base plate 90 which is bolted onto the chassis 50. In the preferred embodiment, the forward bucket is formed by left and right forward posts 68, left and right center posts 70, a front wall 74 and forward side plates 78. Correspondingly, the rear weight bucket 64 is advantageously formed with left and right rear posts 72, a rear wall 76, and left and right rear side plated 80 attached to the center post 70.

Figure 6:
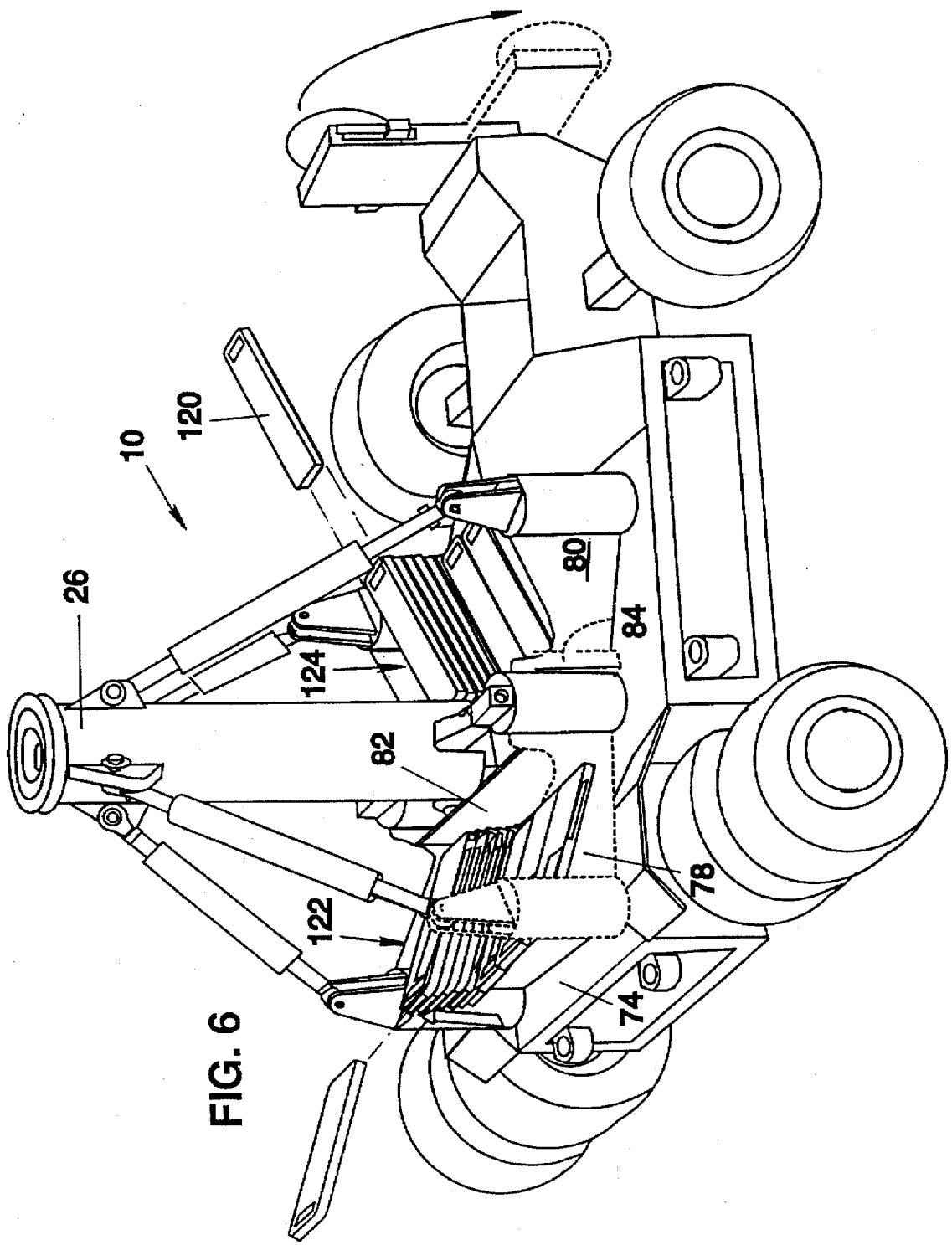
FIG. 6 is a perspective view of the mobile base of FIG. 5 showing storage of the counterweights.

As shown in FIG. 6, a forward center wall 82 and a rear center wall 84 extend laterally between the left and right center posts 70. The counter weights 120 are then conveniently stored as shown in FIG. 6, in a forward weight stack 122 and a rear weight stack 124. The bottom ends of the weights 120 rest on the plate 90 bolted to the chassis 50, with the top ends of the weights, which include a handle opening, supported on the front and rear walls 72 and 74. The spacing between the front wall 74 and the forward center wall 82 as well as the equivalent spacing between the rear center wall 84, and the rear wall 76, accommodate the weights 120, with a very short length of the weights 120 overhanging the walls. In addition, the forward side plates 78 and rear side plates 80 are spaced apart laterally to accommodate for weights placed side by side. The weights 120 are accordingly securely stored on the chassis 50, during transport or when not needed to balance the arm, are readily accessible and visible when needed, and are stored in a way to avoid shifting of the weights 120 during movement. In addition, the weights are stored around the mast 26, which helps to stabilize the mobile base 10.

Turning once again to FIG. 5, a cross beam 86 is attached through cross beam pivot joints 88 to the center posts 70 on the chassis 50. A lateral pivot pin 92 extends longitudinally through the mast 26 and the cross beam 86. A clevis 94 is provided on top of the forward posts 68 and rear posts 72, oriented towards the mast 26. Turn buckles 96 are attached to flanges 102, preferably at 4 aligned positions on the mast 26, via flange pins 104. A clevis pin 98 pivotally secures the lower ends of the turn buckles to the clevises. Self aligning bearings 103 allow for angular variations during leveling. The mast can be leveled by turning the turn buckles 96. A mast plate 106 on the top of the mast 26 is adapted to pivotally support and attach to an arm.

Figure 7:
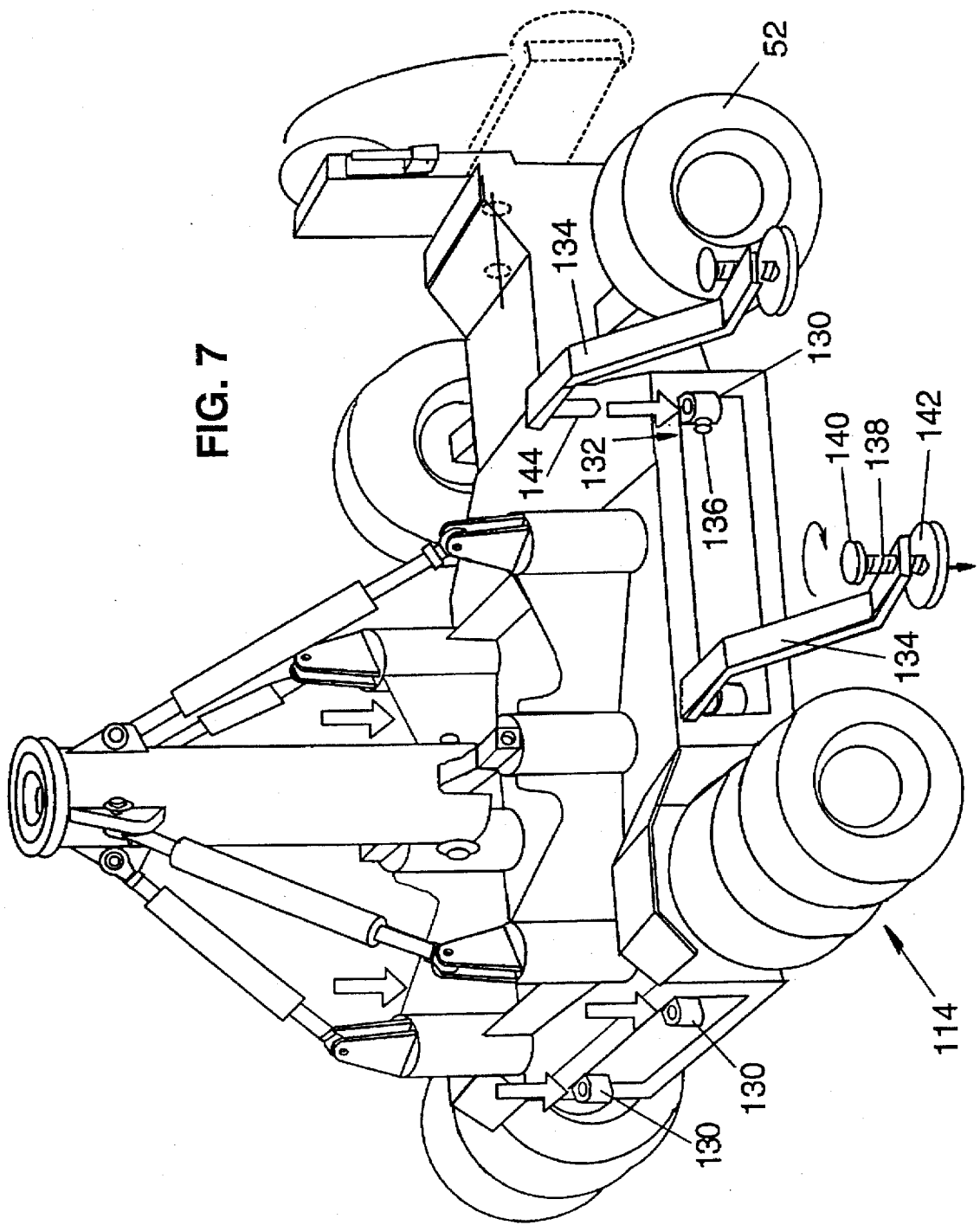
FIG. 7 is a perspective View of the mobile base of FIG. 5, modified to include outriggers.

In the preferred embodiment shown in FIG. 7, shoulder blocks 130 are provided around the chassis 50, to accommodate accessory outriggers 134. Outrigger pins 144 on the outriggers 134 slide into shoulder block holes 132 in the shoulder blocks 130, and are secured by bolts 136 extending through the shoulder blocks 130. Foot screws 138 at the outer ends of the outriggers 134 have handles 140, which are turned to adjust and engage foot pads 142. The outriggers 134 may be used to stabilize the mobile base when the mobile base carries an exceptionally long arm or heavy payloads, or when the base is on soft ground, or in windy conditions. The outriggers 134 can also be used to reduce any shifting or movement of the mobile base arising from use of pneumatic tires.

Figure 8:
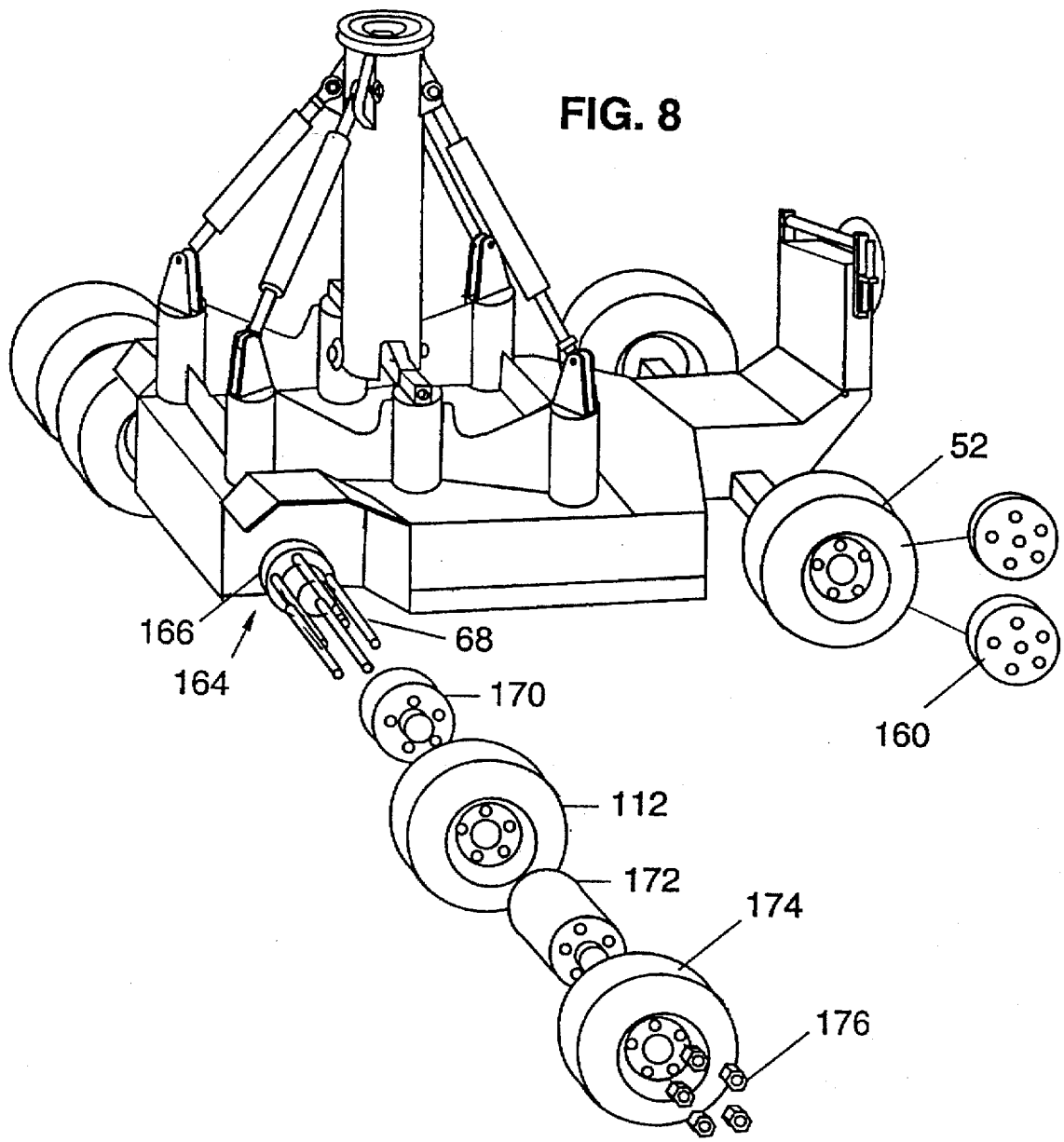
FIG. 8 is a perspective view of a mobile base of FIG. 5, including an exploded view of a modified front axle.
Figure 9:
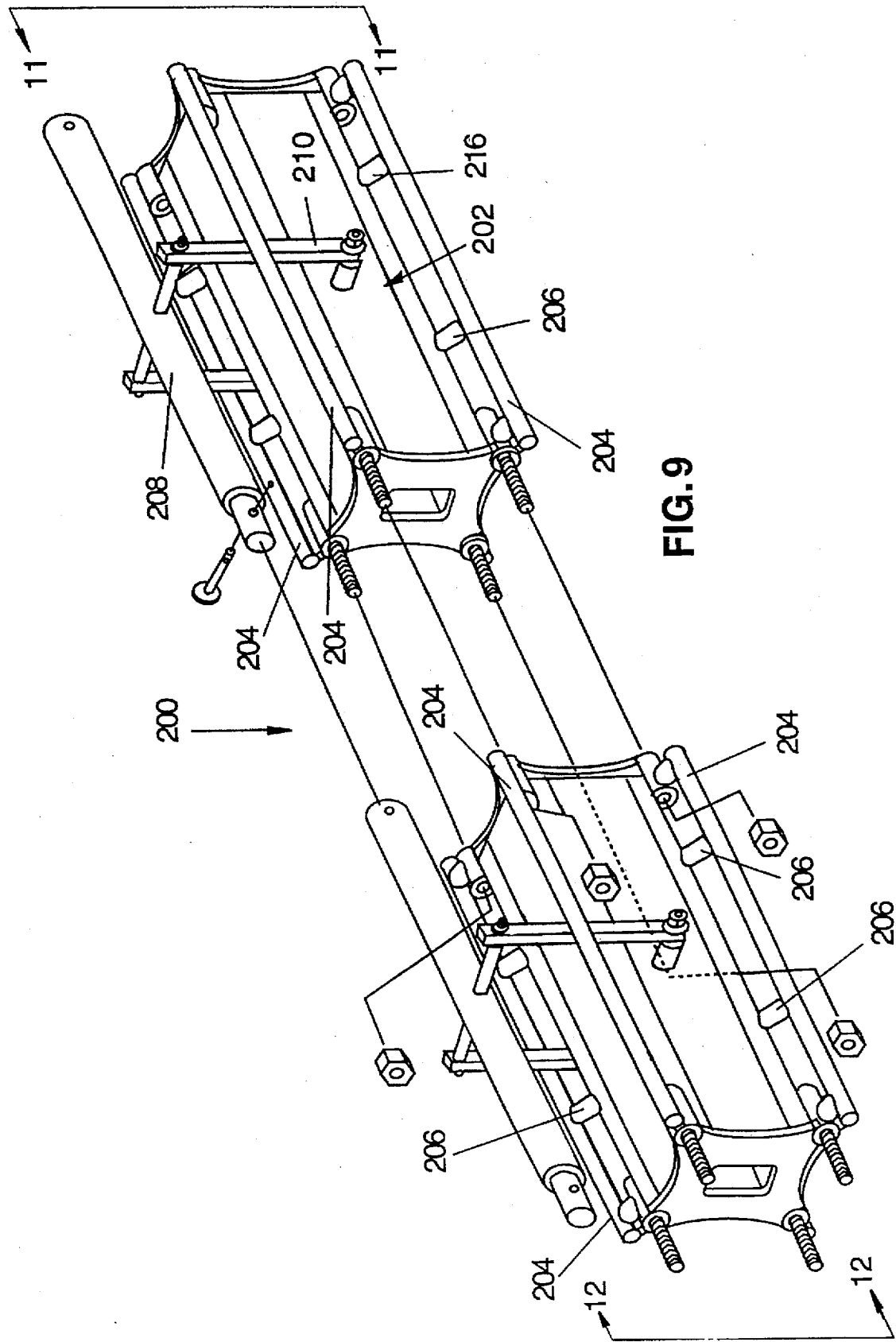
FIG. 9 is a perspective view of the present camera crane arm, showing assembly of the two sections.
Figure 10:
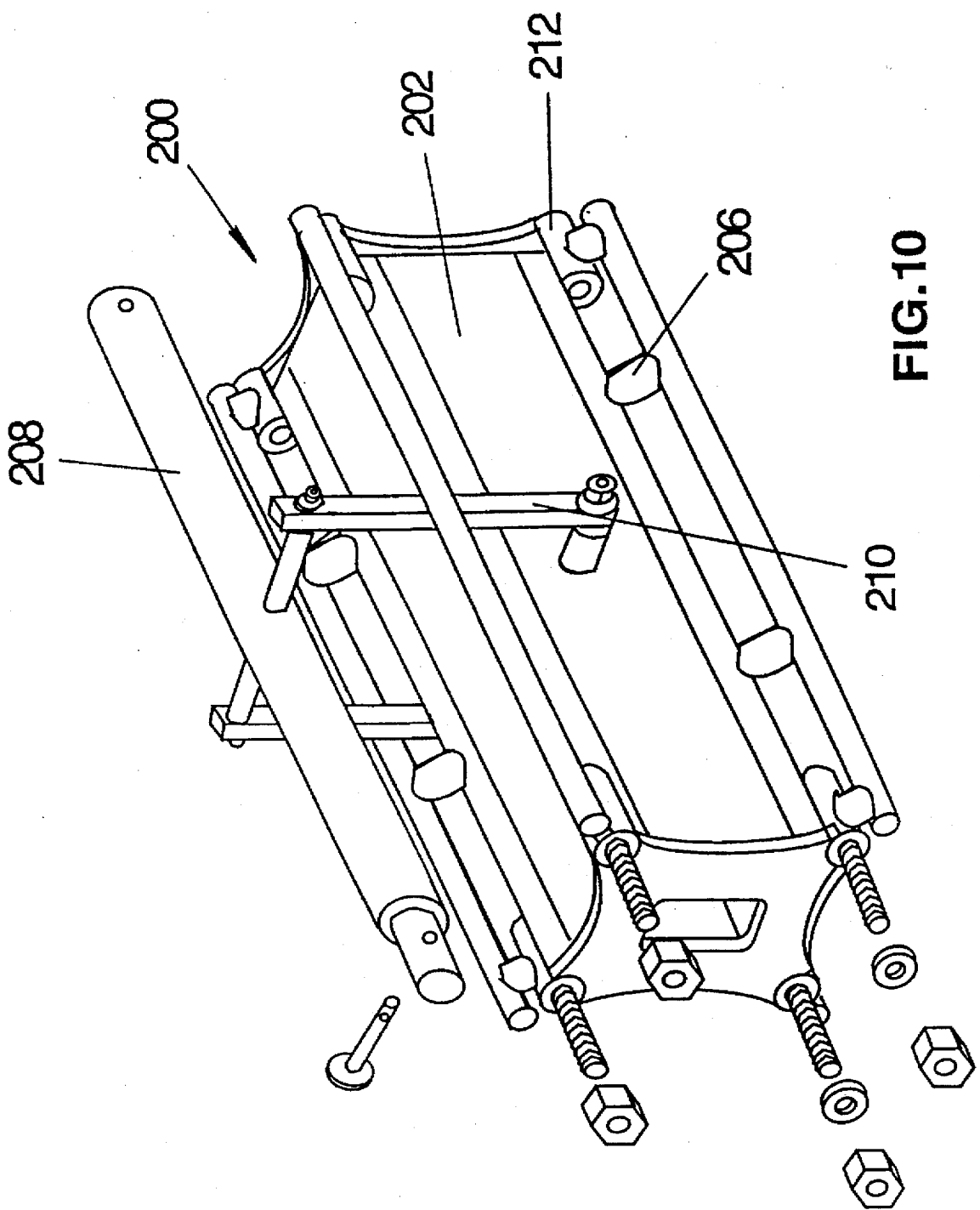
FIG. 10 is a perspective view of a single arm section.

The mobile base 10 has rear wheels 52, which steer, and one or more sets of front wheels 114, which are advantageously driven by electric motors. Referring to FIG. 8, the rear wheels 52 of the mobile base 10 can be shifted outwardly, to align with track, by using spacers 160 and 162. A modified axle 164, on the front of the mobile base 10, has studs 168 extending from a hub 166. An inner spacer 170 fits over the hub 166, followed by a forward inside wheel 112, a middle spacer, a second wheel 174 and lug nuts 176, which hold these components together onto the hub. The hub and spacers allow the mobile base 10 to be provided with single, double, or even triple front wheel sets, which may be selected to match the payload, arm length, and ground characteristics.

As shown in FIGS. 9–15, the present crane arm includes an arm core 202, generally in the form of a rectangular box beam, with scalloped end flanges. Support tubes 204 are attached at the corners of the core 202 on struts 206. A leveling rod 208 is pivotally joined to the core via pivot struts 210. The support tubes advantageously provide ergo-dynamic handles for gripping, lifting or positioning the arm sections. In addition, they help to prevent the core 202 from getting scratched or dented from rough handling. This reduces the frequency and cost of maintenance, especially plating or painting of the core, and maintains the finish and attractive appearance of the core. The support tubes, having a round cross section and smaller diameter, undergo more of a "line" of wear, at the bottom or outer edges from rough handling. The line is localized, not as conspicuous and readily repaired, e.g. by plating or painting. The support tubes also stiffen the arm efficiently, as the weight of the support tubes is at a maximum distance from the neutral axis of the arm. The ends of the support tubes are clamped against each other, to resist bending. The arm sections shown in FIGS. 9–15 can of course come in different sizes and lengths, and various numbers can be assembled together depending the specific application.

Figure 16:
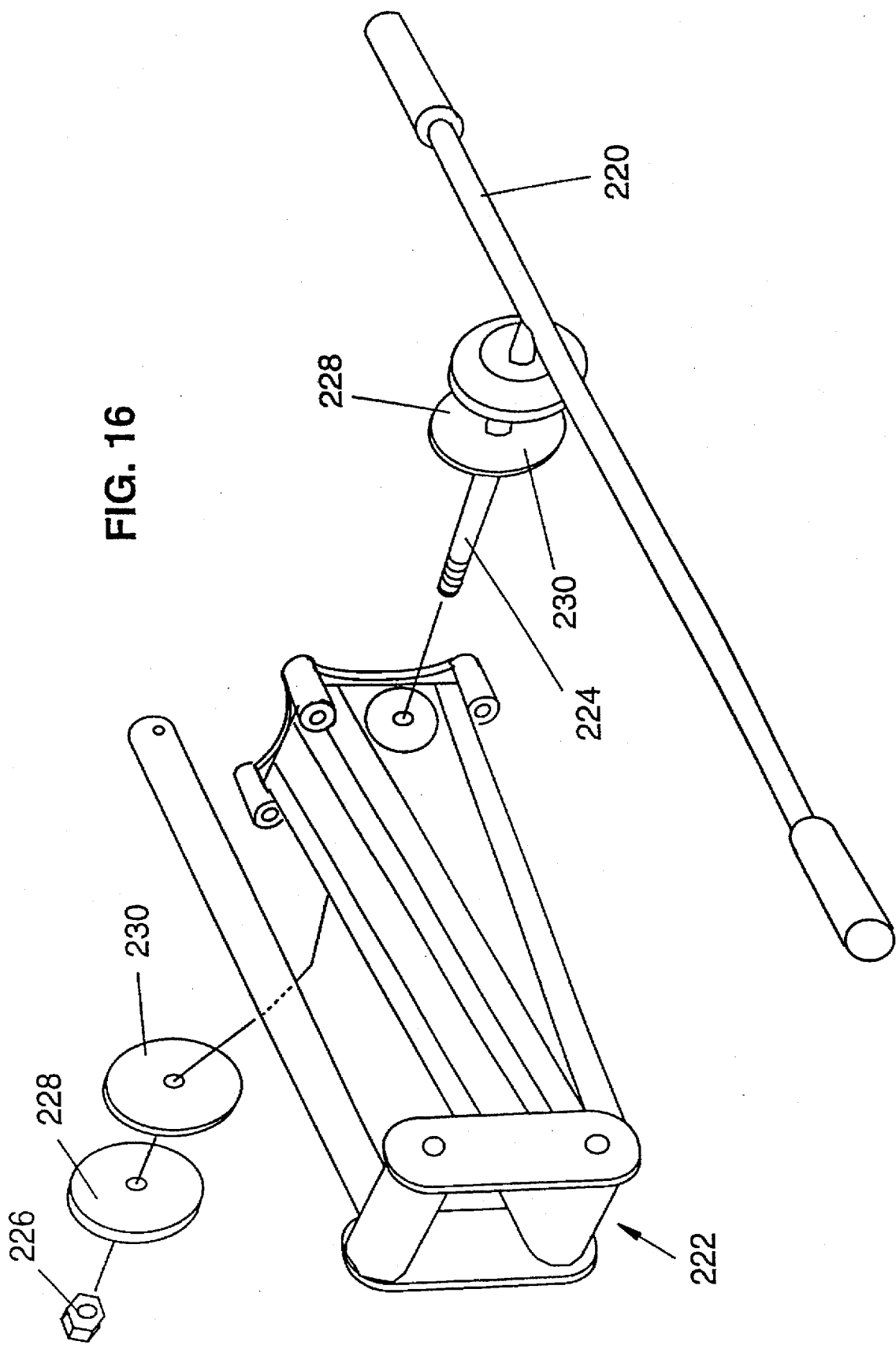
FIG. 16 is a perspective view of a handle assembly for the arm.

FIG. 16 shows a handle 220 which can be attached to the arm end section 222 or to an intermediate section of the arm. Handles 220 may be placed both at the front and at the back of the arm. A cross shaft 224 on the handle 220 passes through the arm core and is secured with a lock nut 226. Caps 228 are secured against Teflon (or similar material) spacers or washers 230. The handle then pivots smoothly and quietly, when it is held by the crane arm operator or grip, and the arm moves up or down. The handle provides the grip with extra reach, at either end of the arm. The locknut is tightened to pretension the handle to a desired amount.

Thus, a novel camera crane has been shown and described. Various modifications will be apparent to those skilled in the art, and my invention should not be restricted except in the spirit of the appended claims.

I claim:

1. A mobile camera crane base comprising:
   a chassis;
   front and rear wheels attached to the chassis;
   a mast on the chassis;
   a crane arm supported on the mast:
   actuator extending between the mast and the arm;
   a weight bucket around the mast; and
   a steering block attached to the chassis via a hinge joint.

2. The mobile camera crane base of claim 1 wherein the hinge joint allows the steering block to pivot towards the front of the chassis.

3. The mobile camera crane base of claim 1 wherein the actuator is an electrically powered actuator.

4. A mobile camera crane base comprising:
   a chassis;
   a mast on the chassis;
   a weight bucket around the mast;
   an axle at the front of the chassis;
   a hub attached to the axle;
   studs projecting from the hub;
   an inner spacer positioned over the studs;
   a first wheel on the studs adjacent to the inner spacer;
   a middle spacer on the studs adjacent to the first wheel;
   a second wheel on the studs adjacent to the middle spacer; and
   lug nuts threaded onto the studs.

5. A mobile camera crane base comprising:
   a chassis;
   wheels attached to the chassis;
   a mast on the chassis;
   a weight bucket around the mast; and
   a leveling system on the chassis for leveling the mast, the leveling system including:
      a cross beam pivotally attached to the chassis and to the mast; and
      a plurality of turnbuckles pivotally attached to the chassis and to the mast.

6. The mobile camera crane base of claim 5 wherein the weight bucket comprises:
   a front plate;
   a pair of side plates attached to the front plate; and
   a back plate attached to the pair of side plates.

7. The mobile camera crane base of claim 6 further comprising:
   a pair of front posts attached to and spaced apart by the front plate; and
   a pair of back posts attached to and spaced apart by the back plate.

8. The mobile camera crane base of claim 5 further comprising outriggers attached to the chassis.

9. The mobile camera crane base of claim 5 further comprising:
   a crane arm supported on the mast; and
   an actuator extending between the mast and the arm.

10. The mobile camera crane base of claim 5 further comprising a steering block attached to the chassis with a hinge joint to allow the steering block to pivot to one side or towards the front of the chassis.

11. The mobile camera crane base of claim 9 further comprising a weight bucket attached to the arm.

12. The mobile camera crane base of claim 11 further comprising a video monitor mounting platform on the weight bucket attached to the arm.

13. A mobile camera crane arm comprising:
   an arm core section;
   a plurality of stiffening tubes attached to the core section by struts and extending parallel to the core section; and
   a leveling tube pivotally attached to the core section.

14. The mobile camera crane arm of claim 13 wherein the arm core section is a box beam and the stiffening tubes are attached to the core section at the corners of the core section.

15. The mobile crane arm of claim 14 wherein the stiffening tubes are round.

16. The mobile camera crane arm of claim 13 wherein the arm core section comprises a rectangular box beam.

* * * * *